US008826770B2

(12) United States Patent
Inoue et al.

(10) Patent No.: US 8,826,770 B2
(45) Date of Patent: Sep. 9, 2014

(54) ELECTRIC STEERING LOCK DEVICE

(71) Applicant: U-Shin Ltd., Tokyo (JP)

(72) Inventors: Takahiro Inoue, Aki-gun (JP); Hideki Norma, Aki-gun (JP)

(73) Assignee: U-Shin Ltd., Tokyo (JP)

( * ) Notice: Subject to any disclaimer, the term of this patent is extended or adjusted under 35 U.S.C. 154(b) by 0 days.

(21) Appl. No.: 13/905,735

(22) Filed: May 30, 2013

(65) Prior Publication Data

US 2013/0319164 A1  Dec. 5, 2013

(30) Foreign Application Priority Data

May 30, 2012  (JP) ................................. 2012-122732

(51) Int. Cl.
*B62D 1/16* (2006.01)
*B60R 25/0215* (2013.01)

(52) U.S. Cl.
CPC .............. *B62D 1/16* (2013.01); *B60R 25/0215* (2013.01)
USPC ................. 74/495; 74/496; 74/497; 280/777; 280/779

(58) Field of Classification Search
USPC ............ 280/775, 777, 779; 74/492, 493, 495, 74/496, 497
See application file for complete search history.

(56) References Cited

U.S. PATENT DOCUMENTS

| | | | | |
|---|---|---|---|---|
| 4,503,504 A | * | 3/1985 | Suzumura et al. | 701/49 |
| 6,349,967 B1 | * | 2/2002 | Cartwright | 280/775 |
| 6,354,626 B1 | * | 3/2002 | Cartwright | 280/777 |
| 7,080,855 B2 | * | 7/2006 | Muller | 280/777 |
| 7,159,904 B2 | * | 1/2007 | Schafer et al. | 280/775 |
| 7,461,863 B2 | * | 12/2008 | Muller | 280/777 |
| 2005/0161930 A1 | * | 7/2005 | Schafer et al. | 280/775 |
| 2005/0269811 A1 | * | 12/2005 | Schneider et al. | 280/777 |
| 2006/0244251 A1 | * | 11/2006 | Muller | 280/777 |
| 2014/0069224 A1 | * | 3/2014 | Dimig et al. | 74/495 |

* cited by examiner

*Primary Examiner* — Toan To
(74) *Attorney, Agent, or Firm* — Westerman, Hattori, Daniels & Adrian, LLP

(57) ABSTRACT

An objective is to provide an electric steering lock device capable of preventing a lock member from being falsely detected as being at an unlock position to unfailingly ensure that an engine is started with a steering wheel being unlocked. In the electric steering lock device, magnetic detection means placed at a position corresponding to an unlock position of the lock member is configured by including a Hall element (north-pole magnetic detection element) configured to be turned on when detecting the north pole of a magnet fixed to the lock member and a Hall element (south-pole magnetic detection element) configured to be turned on when detecting the south pole of the magnet. A microcomputer (control means) determines that the lock member has moved to the unlock position when the Hall elements (north-pole and south-pole magnetic detection elements) are both turned on, and then stops driving an electric motor (electric actuator).

5 Claims, 9 Drawing Sheets

ELECTRIC STEERING LOCK DEVICE

BACKGROUND OF THE INVENTION

1. Field of the Invention

The present invention relates to an electric steering lock device configured to electrically lock rotation of a steering wheel of a parked vehicle.

2. Description of the Related Art

In recent years, as protection against theft, some vehicles are equipped with an electric steering lock device configured to electrically lock rotation of a steering wheel while the vehicle is parked. This electric steering lock device includes: a lock member movable between a lock position at which the lock member engages with a steering shaft of the vehicle and an unlock position at which the lock member disengages from the steering shaft; an electric motor which is an electric actuator configured to actuate the lock member, and a drive mechanism configured to convert a rotational force of an output shaft of the electric motor into a force making the lock member advance or retract.

In such an electric steering lock device, when the vehicle stops and a driver turns off an engine start switch with an engine running, a higher-level unit of the electric steering lock device detects this and stops the engine. Provided that the safety is confirmed, the higher-level unit sends a lock request to the electric steering lock device. Upon receipt of the lock request, the electric steering lock device drives the electric motor to move the lock member so that the lock member may engage with the steering shaft. Thus, rotation of the steering wheel is locked.

On the other hand, when the driver turns on the engine start switch with the vehicle, and therefore the engine, being stopped, the higher-level unit detects this and sends an unlock request to the electric steering lock device. Upon receipt of the unlock request, the electric steering lock device drives the electric motor to move the lock member so that the lock member may disengage from the steering shaft. The steering wheel is thus unlocked to enable steering maneuvers.

In this way, in order for the electric steering lock device to electrically lock and unlock the steering wheel, driving of the electric motor has to be controlled based on a detection whether the lock member is at the lock position or at the unlock position, and to detect this, a mechanism for defecting the position of the lock member is provided. For example, the following mechanism is used as this position detecting mechanism (see, for example, Japanese Patent Application Publication No. 2008-049908). Specifically, a magnet is attached to a movable member such as the lock member, and magnetic detection elements, such as Hall elements, are placed at a position corresponding to the lock position and at a position corresponding to the unlock position, respectively. Then, by causing the magnetic defection elements to detect the magnetic force of the magnet, it is detected whether the lock member is at the lock position or at the unlock position.

In the electric steering lock device, it has to be ensured that the lock member is at the unlock position for sure so that the engine may not be started with the rotation of the steering wheel being locked. As one of measures for ensuring that, multiple magnetic detection elements are placed at the position on the unlock side. In this method, a failure of one of the magnetic detection elements can be checked based on outputs of the other electric detection elements. Thus, false detection of the position of the lock member can be prevented.

However, in the method of placing multiple magnetic detection elements at the unlock-side position, when affected by an unexpected strong electromagnetic field, the multiple magnetic detection elements on the unlock side are all switched from an OFF state to an ON state even when the lock member is not actually at the unlock position. The lock member is thus falsely detected as having moved to the unlock state. Then, the lock member is stopped halfway, and the engine might be started with the rotation of the steering wheel still being locked.

SUMMARY OF THE INVENTION

The present invention has been made in view of the above problem and has an objective of providing an electric steering lock device capable of preventing the lock member from being falsely detected as being at the unlock position and thus unfailingly ensuring that the engine is started with the steering wheel being unlocked.

To achieve the above objective, a first aspect of the invention provides an electric steering lock device comprising: a lock member movable between a lock position at which the lock member engages with a steering shaft of a vehicle and an unlock position at which the lock member disengages from the steering shaft; an electric actuator configured to actuate the lock member; a driving mechanism configured to convert a drive force of the electric actuator into a force for making the lock member advance or retract; a magnet configured to move in conjunction with the lock member; magnetic detection means for detecting a magnetic force of the magnet, the magnetic detection means being placed at a position corresponding to the lock position and at a position corresponding to the unlock position; and control means for finding a position of the lock member based on a result of the detection by the magnetic detection means and accordingly controlling driving of the electric actuator. The magnetic detection means placed at the position corresponding to the unlock position includes a north-pole magnetic detection element configured to be turned on upon detection of a north pole of the magnet and a south-pole magnetic detection element configured to be turned on upon detection of a south pole of the magnet. The control means determines that the lock member has moved to the unlock position when both of the north-pole magnetic detection element and the south-pole magnetic detection element are turned on, and then stops driving the electric actuator.

In a second aspect of the invention according to the first-aspect of the invention, the north pole and the south pole of the magnet are arranged side by side in a direction orthogonal to a moving direction of the magnet, and the north-pole magnetic detection element and the south-pole magnetic detection element are placed in the direction orthogonal to the moving direction of the magnet so as to correspond to the arrangement of the north pole and the south pole of the magnet.

In a third aspect of the invention according to any one of the first and second aspects of the invention, opposite poles from the north pole and the south pole, which are another south pole and another north pole, are superimposed on the north pole and the south pole of the magnet, respectively, on a side opposite from a side where the north pole and the south pole face the north-pole magnetic detection element and the south-pole magnetic detection element, respectively.

In a fourth aspect of the invention according to any one of the first to third aspects of the invention, the magnetic detection means are placed on a printed circuit board, and any one of the north-pole magnetic detection element and the south-pole magnetic detection element is placed on one surface of the printed circuit board which is opposite to a surface facing the magnet. The magnetic detection element placed on the one surface is configured to function as a magnetic detection element configured to detect a magnetic force of the magnet, the magnetic force being of an opposite pole from that detected by the magnetic detection means placed on the surface facing the magnet.

In a fifth aspect of the invention according to any one of the first to fourth aspects of the invention, the control means stops driving the electric actuator after a lapse of a predetermined time period since actuation of the electric actuator.

According to the first aspect of the invention, the control means determines that the lock member has moved to the unlock position when both of the north-pole magnetic detection element and the south-pole magnetic detection element of the magnetic detection means are turned on. Thus, even when an external monopole (north-pole or south pole) electromagnetic field is exerted while the lock member is moving from the lock position to the unlock position, the north-pole magnetic detection element and the south-pole magnetic detection element are not turned on simultaneously, and at least one of them maintains its OFF state. Thus, the control means does not falsely determine that the lock member has moved to the unlock position, and continues to drive the electric actuator, so that the lock member keeps moving to the unlock position.

Thus, the lock member 6 is prevented from being stopped halfway due to a false detection that the lock member has moved to the unlock position even though the lock member has actually not reached the unlock position yet. Thereby, it is reliably prevented that the engine is started with the turning of the steering wheel being locked.

According to the second aspect of the invention, the north pole and the south pole of the magnet are arranged side by side in the direction orthogonal to the moving direction of the magnet, and the north-pole magnetic detection element and the south-pole magnetic detection element are placed in the direction orthogonal to the moving direction of the magnet so as to correspond to the arrangement of the north pole and the south pole of the magnet. Thus, the north pole and the south pole of the magnet can be made long in the moving direction of the magnet. Consequently, a movable range of the magnet in which the north-pole magnetic detection element and the south-pole magnetic detection element are simultaneously turned on can be expanded, so that a position at which the magnet is stopped at the unlock posit ion can be set within a wider range to thereby enhance design flexibility.

According to the third aspect of the invention, the north pole and the south pole are superimposed in a direction extending from the magnet toward the magnetic detection elements. Thus, magnetic field loops can be extended long toward the magnetic detection elements to increase the strength of the magnetic field to be detected by the magnetic detection elements. This allows reliable detection of the position of the lock member.

According to the fourth aspect of the invention, one of the magnetic detection elements is placed on the surface of the printed circuit board opposite to the surface facing the magnet. Thus, the orientation of the magnetic detection element with respect to the magnet can be reversed. In other words, the orientation of a magnetic field passing through the magnetic detection element can be reversed so that the south pole of the magnet can be detected by the north-pole magnetic detection element, and the north pole of the magnet can be detected by the south-pole magnetic detection element. Hence, even when the magnetic detection means is configured by including both a north-pole magnetic detection element and a south-pole magnetic detection element, the south-pole magnetic detection element, for example, can be used as a north-pole detection element, and the magnetic detection means can be configured with only south-pole detection elements. This can reduce parts control steps and the per-piece cost and thereby reduce the cost for manufacturing the electric steering lock device.

According to the fifth aspect of the invention, when the magnetic detection elements are not all turned on even through the lock member has moved to the unlock position, the control means stops driving the electric actuator after a lapse of a predetermined time. Thus, it is prevented that the electric actuator is kept being driven.

DESCRIPTION OF THE PREFERRED EMBODIMENTS

With reference to the appended drawings, embodiments of the present invention are described below.

<Embodiment 1>

Figure 1:
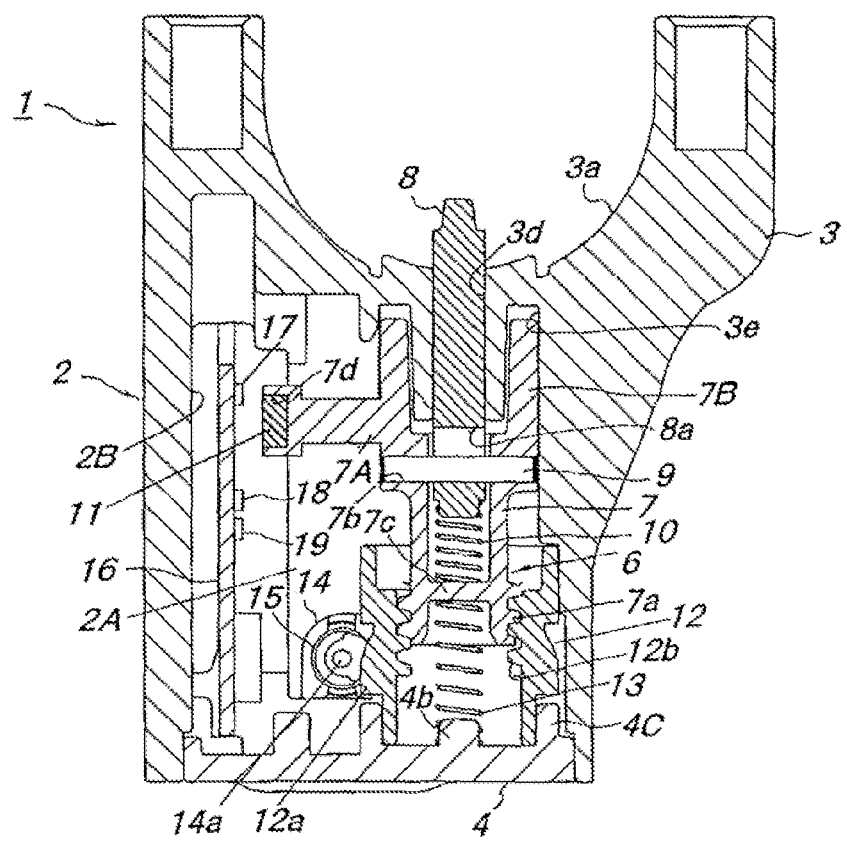
FIG. 1 is a vertical sectional view of an electric steering lock device according to Embodiment 1 of the present invention, the device being in a locked state.
Figure 2:
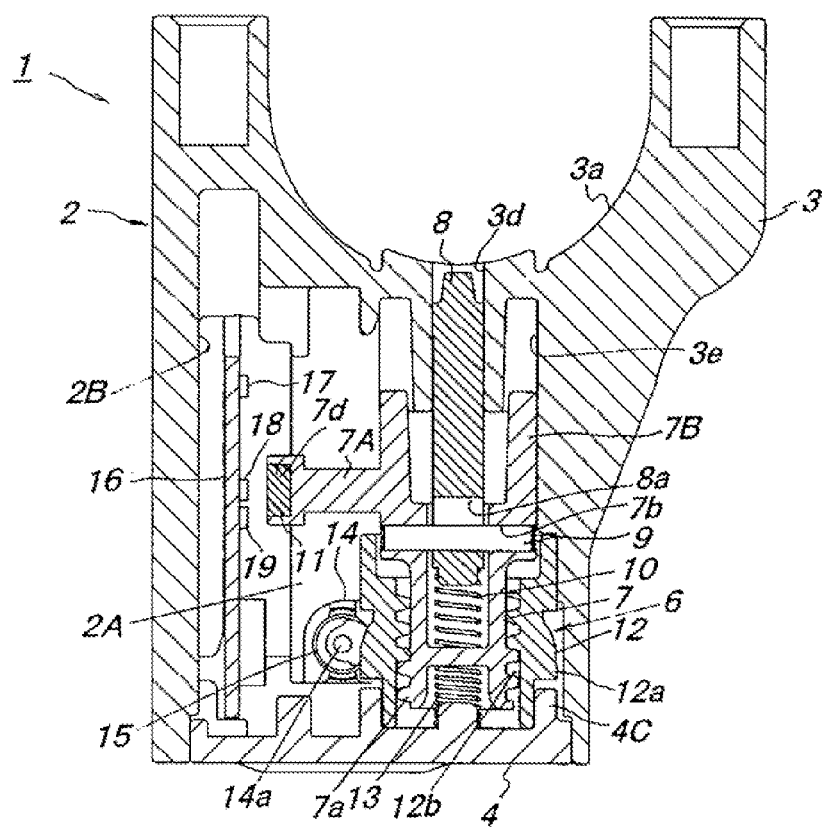
FIG. 2 is a vertical sectional view of the electric steering lock device according to Embodiment 1 of the present invention, the device being in an unlocked state.
Figure 3:
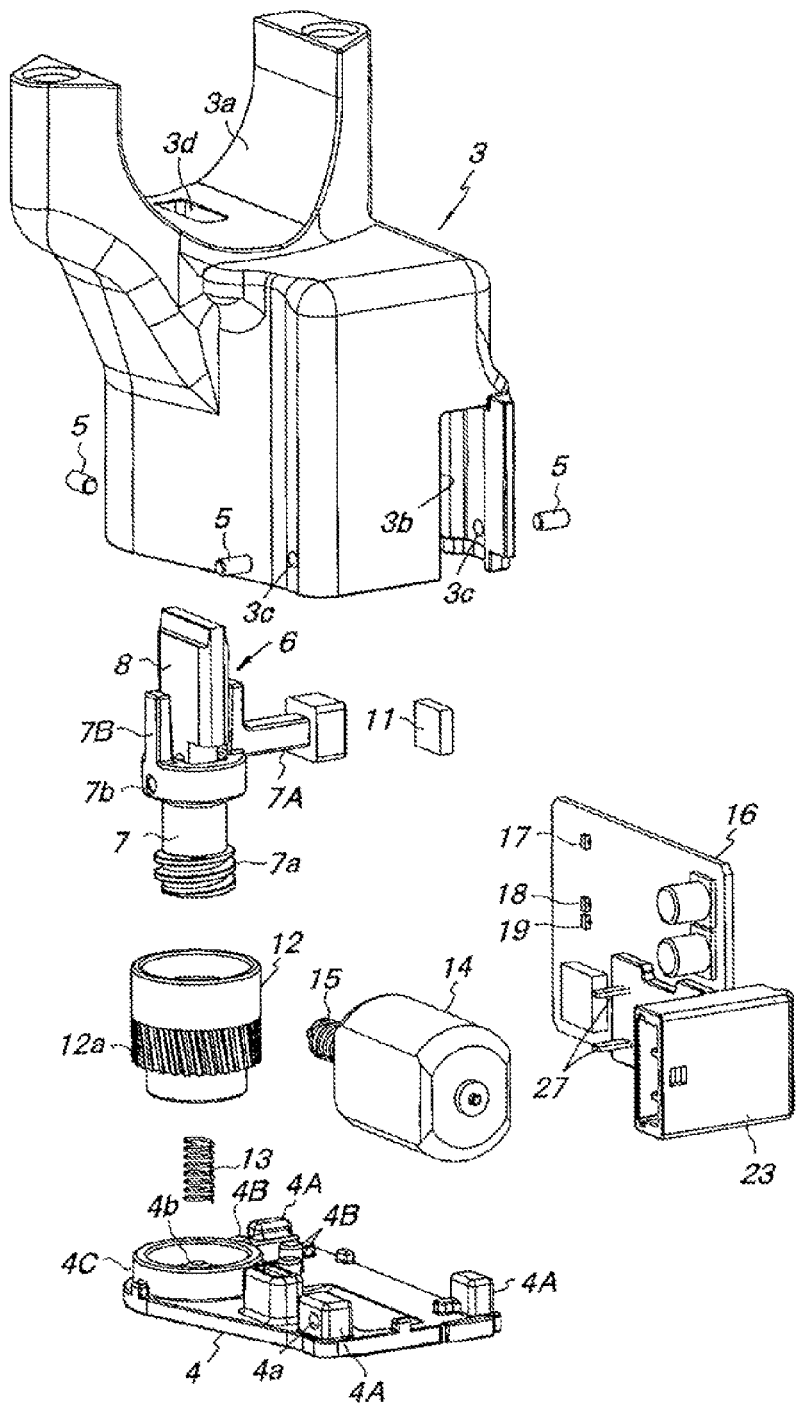
FIG. 3 is an exploded perspective view of the electric steering lock device according to Embodiment 1 of the present invention.
Figure 4:
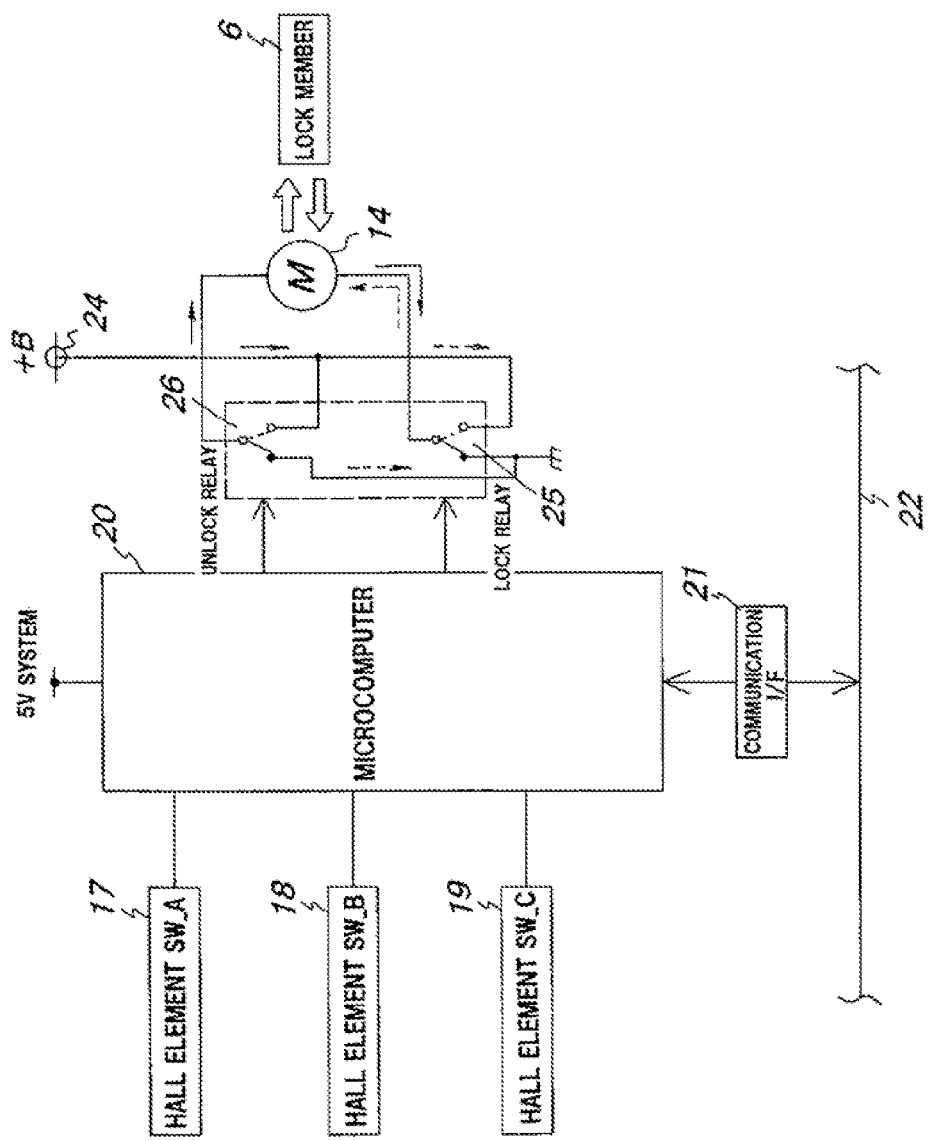
FIG. 4 is a system configuration diagram of the electric steering lock device according to Embodiment 1 of the present invention.
Figure 5:
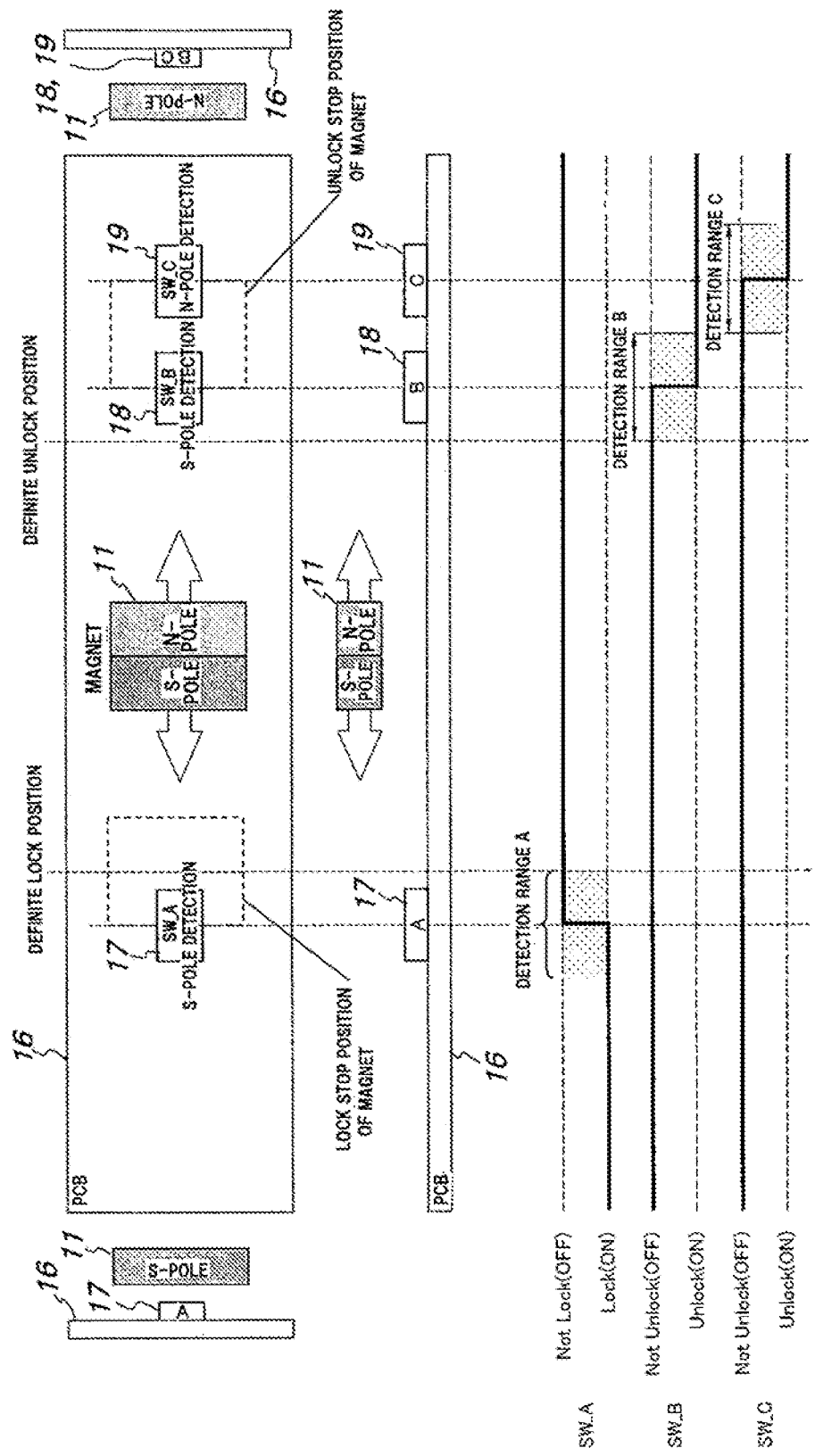
FIG. 5 is a diagram illustrating detection of the position of a lock member by Hall elements of the electric steering lock device according to Embodiment 1 of the present invention.

FIG. 1 is a vertical sectional view of an electric steering lock device according to Embodiment 1 of the present invention, the device being in a locked state. FIG. 2 is a vertical sectional view of the electric steering lock device in an unlocked state. FIG. 3 is an exploded perspective view of the electric steering lock device. FIG. 4 is a system configuration diagram of the electric steering lock device. FIG. 5 is a diagram illustrating detection of the position of a lock member by Hall elements of the electric steering lock device.

An electric steering lock device 1 according to the present invention is configured to electrically lock/unlock rotation of a steering shaft (steering wheel) (not shown). A housing 2 of the electric steering lock device 1 is formed by a case 3 made of a non-magnetic metal (e.g., an magnesium alloy) and a metallic lid 4 covering an opening of the case 3 at its lower surface.

The case 3 is shaped into a rectangular box, and an arc-shaped recessed portion 3a is formed at an upper portion thereof. A column tube (not shown) is fitted to this recessed portion 3a, and is fixed to the case 3 with an arc-shaped bracket (not shown) fastened to the case 3. Although not shown, a steering shaft is inserted in the column tube. A steering wheel is fastened to an upper end of the steering shaft, and a lower end of the steering shaft is connected to a steering gear box constituting a steering system. When a driver turns the steering wheel, the rotation of the steering wheel is transmitted to the steering gear box via the steering shaft, and a steering mechanism (not shown) is driven to rotate paired left and right front wheels. Thus, required steering is performed.

As shown in FIG. 3, a side portion of the case 3 is open as a rectangular connector placement portion 3b, and a circular pin hole 3c into which a pin 5 is to be pressed is formed in each of three side surfaces of the case 3, excluding the side surface where the connector placement portion 3b is formed (only two pin holes 3c are shown in FIG. 3).

The lid 4 is shaped into a rectangular plate, and three block-shaped pinning portions 4A, three columnar cover pressing portions 4B, and a gear holding tube portion 4C with one closed end are provided integrally with the lid 4 in an upright manner on an inner surface (upper surface) thereof. The three pinning portions 4A are formed at locations corresponding to the positions of the pin holes 3c, and are each provided with a circular pin insertion hole 4a into which the pin 5 is to be pressed (only one pin insertion hole 4a is shown in FIG. 3).

As shown in FIGS. 1 and 2, the lid 4 is fitted into an inner periphery of a lower end portion of the case 3 in such a manner as to cover, from below, the opening portion of the case at its lower surface. Then, the lid 4 is fixed to the case 3 by inserting the pins 5 through the three pin holes 3c formed at the side surfaces of the case 3 (see FIG. 3) and pressing the pins 5 into the pin insertion holes 4a formed in the three pinning portions 4A uprightly provided on the lid 4, respectively.

As shown in FIGS. 1 and 2, a lock-member housing portion 2A and a board housing portion 2B are formed in the housing 2, and a lock member 6 is housed in the lock-member housing portion 2A. The lock member 6 is formed by a substantially cylindrical driver 7 having an external thread portion 7a engraved on an outer periphery of its lower end portion, and a plate-shaped lock bolt 8 accommodated in the driver 7 such that the lock bolt 8 is movable up and down. A long hole 8a which is long in a vertical direction is formed in the lock bolt 8, and the lock bolt 8 is connected to the driver 7 by a pin 9 inserted horizontally through the long hole 8a. The pin 9 is inserted and held in a pin insertion hole 7b by being pressed thereinto, the pin insertion hole 7b being penetrated horizontally through the driver 7.

The lock bolt 8 is fitted in a rectangular insertion hole 3d in the case 3 such that the lock bolt 8 is movable up and down, and is constantly biased upward by a spring 10 provided in a compressed state between the lock bolt 8 and a partition 7c of the driver 7. Usually, the lock bolt 8 moves up and down along with the driver 7 with a lower portion of the long hole 8a of the lock bolt 8 engaging with the pin 9.

An arm 7A as an engagement portion extending horizontally and an anti-rotation portion 7B which is a vertically-long engagement portion are formed at an outer periphery of an upper portion of the driver 7 integrally, at positions opposite each other. The arm 7A is accommodated in the housing 2 (the case 3) in such a manner that the arm 7A is movable up and down, and the anti-rotation portion 7B blocks rotation of the driver 7 by engaging with an engagement groove 3e formed in the case 3. A magnet housing portion 7d, having a rectangular shape in transverse section, is formed at a tip end portion of the arm 7A, and a magnet 11 having a quadrangular prism shape is pressed into and housed in this magnet housing portion 7d.

As shown in FIGS. 1 and 2, a cylindrical gear member 12 is rotatably housed in the lock-member housing portion 2A formed in the housing 2, and an outer periphery of a lower portion of the gear member 12 is rotatably held by the gear holding tube portion 4C provided uprightly on the inner surface (upper surface) of the lid 4. A worm gear 12a is formed at the outer periphery of the lower portion of the gear member 12, and an internal thread portion 12b is formed at an inner periphery of the gear member 12.

A lower portion of the driver 7 is inserted into the inside of the gear member 12, and the internal thread portion 12b formed at the inner periphery of the gear member 12 meshes with the external thread portion 7a formed on the outer periphery of the lower portion of the driver 7. A spring 13 is provided in a compressed state between the partition 7c of the driver 7 and a columnar spring bearing 4b formed at a center portion of the gear holding tube portion 4C of the lid 4, and the lock member 6 (the driver 7 and the lock bolt 8) is constantly biased upward by the spring 13.

As shown in FIGS. 1 and 2, an electric motor 14 (an electric actuator) is housed transversely in the lock-member housing portion 2A formed in the housing 2, and a worm 15 of a small diameter is formed at an output shaft 14a of the electric motor 14. The worm 15 meshes with the worm gear 12a formed on the outer periphery of the gear member 12. The worm 15 and the worm gear 12a constitute a driving mechanism configured to convert a rotational force of the output shaft 14a of the electric motor 14 into a force for making the lock member 6 advance or retract.

As shown in FIGS. 1 and 2, a printed circuit board 16 is housed in the board housing portion 2B in the housing 2 uprightly so that the inner surface of the printed circuit board 16 may be in parallel with the moving direction of the lock member 6. A single Hall element 17 is provided at an upper position on an inner surface of the printed circuit board 16, the position corresponding to a lock position, and two hall elements 18 and 19 are provided at a lower position on that inner surface, the position corresponding to an unlock position. The Hall elements 17 to 19 are magnetic detection means and detect the position of the lock member 6 (the lock bolt 8) (at the lock position or the unlock position) as will be described later.

As shown in FIG. 5, the Hall element 17 is a south-pole magnetic detection element (denoted as "SW_A" below) configured to be turned on upon detection of the south pole of the magnet 11 at the lock position, and the Hall elements 18 and 19 are a south-pole magnetic detection element (denoted as "SW_B" below) and a north-pole magnetic detection element (denoted as "SW_C" below) configured to be turned on upon detection of the south pole and the north pole of the magnet 11, respectively, at the unlock position. Note that the Hall element (SW_B) 18 is located above the Hall element (SW_C) along the moving direction of the magnet 11.

Next, based on FIG. 4, the system configuration of the electric steering lock device 1 is described below.

The Hall elements 17 to 19 are electrically connected to a microcomputer 20 which is control means for controlling driving of the electric motor 14, and the microcomputer 20 is electrically connected to an ECU (not shown) of the vehicle via a communication interface (communication I/F) 21 and a communication line 22 of the vehicle. As shown in FIG. 3, a connector 23 serving the function of the communication interface 21 is attached to the board 16, and an electrical connection line (not shown) extending from the microcomputer 20 (see FIG. 4) is connected to the connector 23 to electrically connect the Hall elements 17 to 19 to the microcomputer 20 as described above.

As shown in FIG. 5, the single Hall element (SW_A) 17 placed at the lock position of the board 16 is switched from an OFF state (Not Lock (OFF)) to an ON state (Lock (ON)) upon detection of the south pole of the magnet 11 provided at the lock member 6 (the arm 7A), and the microcomputer 20 thereby determines that the lock bolt 8 has moved to the lock position.

The Hall element (SW_B) 18, which is one of the Hall elements placed at the unlock position of the printed circuit board 16, is switched from an OFF state (Not Unlock (OFF)) to an ON state (Unlock (ON)) upon detection of the south pole of the magnet 11, and the Hall element (SW_C) 19, which is the other one of the Hall elements placed at the unlock position of the printed circuit board 16, is switched from an OFF state (Not Unlock (OFF)) to an ON state (Unlock (ON)) upon detection of the north pole of the magnet 11. The microcomputer 20 thereby determines that the lock bolt 8 has moved to the unlock position.

As shown in FIG. 4, via a lock relay 25 and an unlock relay 26, the electric motor (M) 14 is electrically connected to a battery 24 mounted on the vehicle, and the lock relay 25 and the unlock relay 26 are driven in response to a lock signal and an unlock signal, respectively, sent by the microcomputer 20. As shown in FIG. 3, the connector 23 has two motor power feeding terminals 27 provided in a protruding manner one above the other, and these motor power feeding terminals 27 are connected to the electric motor 14.

Next, a description is given of operations (lock/unlock operations) of the electric steering lock device 1 configured as above.

While the engine (not shown) is stopped, the lock bolt 8 of the lock member 6 is at the upper-limit lock position, as shown in FIG. 1, where an upper end portion of the lock bolt 8 protrudes from the lock bolt insertion hole 3d of the case 3 into the recessed portion 3a thereof to engage with the steering shaft (not shown) and to thereby lock rotation of the steering shaft. In this locked state, the steering wheel (not shown) cannot be turned, which prevents theft of the vehicle. In this state, the magnet 11 accommodated in the arm 7A is located near the Hall element (SW_A) 17 on the board 16 (at a position indicated by a broken line on the left side in FIG. 5), and therefore the Hall element (SW_A) 17 is in the ON state (Lock (ON)). The microcomputer 20 thereby finds that the lock bolt 8 is at the lock position. A "definite lock position" shown in FIG. 5 is a position at which the steering shaft completely engages with the lock bolt 8 and is thereby locked. In addition, a "detection range A" is a variation range in which the Hall element (SW_A) 17 detects the south pole of the magnet 11 and transitions from the OFF state (Not Lock (OFF)) to the ON state (Lock (ON)). In other words, even Hall elements of the same model show variations as to the position of the magnet when it detects the magnet, and the Hall element (SW_A) 17 is switched from the OFF state to the ON state when a left end portion of the magnet 11 is anywhere in the "detection range A." Thus, for convenience of illustration, in FIG. 5, a center position of the "detection range A" is shown as a position at which the Hall element (SW_A) 17 transitions from the OFF state (Not Lock (OFF)) to the ON state (Lock (ON)).

When the driver turns on the engine start switch (not shown) in the above state, the ECU detects this and sends an unlock request signal to the electric steering lock device 1. Then, the microcomputer 20 of the electric steering lock device 1 outputs an unlock signal to the unlock relay 26. Then, the lock relay 26 shown in FIG. 4 is switched to the position indicated by a broken line. Since the lock relay 25 is at a position indicated by a solid line, current from the battery 24 flows along a path indicated by solid-line arrows in FIG. 4 to actuate the electric motor 14.

When the electric motor 14 is actuated as above, rotation of its output shaft 14a is decelerated by the worm 15 and the worm gear 12a, and the direction is converted to a vertical direction and transmitted to the gear member 12. Since the gear member 12 is thereby rotated, the driver 7 having the external thread portion 7a meshing with the internal thread portion 12b engraved on the inner periphery of the gear member 12 moves downward against the biasing force of the spring 13. When the driver 7 thus moves downward, the arm 7A formed integrally with the driver 7 and the lock bolt 8 connected to the driver 7 by the pin 9 moves downward.

When the arm 7A of the driver 7 moves downward as described above to make the lock bolt 8 reach the lower-limit unlock position as shown in FIG. 2, the upper end portion of the lock bolt 8 retracts to the inside of the lock bolt insertion hole 3d of the case 3, and thereby the lock bolt 8 disengages from the steering shaft. Thus, the steering shaft is unlocked, allowing the driver to turn the steering wheel. In this event, when the magnet 11 provided at she arm 7A of the driver 7 moves to a position indicated by a broken line on the right side in FIG. 5, the two Hall elements (SW_B) 18 and (SW_C) 19 are both switched from the OFF state (Not Unlock (OFF)) to the ON state (Unlock (ON)). The microcomputer 20 thereby finds that the lock bolt 8 has moved to the unlock position, and then stops driving the electric motor 14 and sends an unlock completion signal to the ECU on the vehicle side via the communication I/F 21 and the communication line 22 shown in FIG. 4. As a result, the unlock state shown in FIG. 2 is maintained, and the engine of the vehicle can be started.

A "definite unlock position" is a position where, when a right end portion of the magnet 11 moves to this position, the lock bolt 8 disengages from the steering shaft completely to unlock the steering shaft. In addition, a "detection range B" is a range in which the Hall element (SW_B) 18 is switched from the OFF state (Not Unlock (OFF)) to the ON state (Unlock (ON)) when the right end portion of the south pole of the magnet 11 is anywhere in this range, and a "detection range C" is a range in which the Hall element (SW_C) 19 is switched from the OFF state (Not Unlock (OFF)) to the ON state (Unlock (ON)) when the right end portion of the north pole of the magnet 11 is anywhere in this range.

When the driver stops the vehicle and turns the engine off by turning off the engine start switch, the ECU detects this and sends a lock request signal to the electric steering lock device 1. Then, the microcomputer 20 of the electric steering lock device 1 outputs a lock signal to switch the lock relay 23 shown in FIG. 4 to the position indicated by the broken line. Since the unlock relay 26 is at the position indicated by the solid line, current from the battery 24 flows along a path shown by broken-line arrows in FIG. 4 to reversely actuate the electric motor 14, and its output shaft 14a thus rotates backward.

When the output shaft 14a of the electric motor 14 rotates backward as described above, the rotation thereof is transmitted to the gear member 12 via the worm 15 and the worm gear 12a, and the gear member 12 rotates backward. The driver 7 thereby moves upward, moving up the arm 7A formed integrally with the driver 7 and the lock bolt 8 connected to the driver 7 by the pin 9.

When the arm 7a of the driver 7 thus moves upward and the magnet 11 reaches the position indicated by the broken line on the left side in FIG. 5, the Hall element (SW_A) 17 provided near the lock position is switched from the OFF state (Not Lock (OFF)) to the ON state (Lock (ON)). The microcomputer 20 thereby finds that the lock, bolt B has moved to the lock position, and then stops driving the electric motor 14 and sends a lock completion signal to the ECU on the vehicle side via the communication I/F 21 and the communication line 22 shown in FIG. 4. As a result, as shown in FIG. 1, the upper end portion of the lock bolt 8 protrudes from the recessed portion 3a of the case 3 to engage with the steering shaft (not shown), and rotation of the steering shaft is thus locked. In this locked state, theft of the vehicle while the vehicle is parked is prevented. When the lock bolt 8 does not favorably engage with an engagement groove of the steering shaft, the lock bolt 8 moves downward against the biasing force of the spring 10 within a range where the pin 9 can relatively move inside the long hole 8a formed at the lock bolt 8, and therefore no excessive load acts on the lock bolt 8.

Next, a description is given of an operation performed in a case where a strong electromagnetic field is exerted while the lock bolt 8 is moving from the lock position to the unlock position.

While the lock bolt 8 is moving from the lock position to the unlock position, the Hall elements (SW_B) 18 and (SW_C) 19 are both in the OFF state (Not Unlock (OFF)). If, for example, a strong external south-pole electromagnetic field is exerted in this state, only the Hall element (SW_B) 18 malfunctions to be turned on (Unlock (ON)), the Hall element (SW_C) 19 configured to be turned on upon detection of the north pole maintains its OFF state (Not Unlock (OFF)). In this way, even when a strong south-pole electromagnetic field is exerted, the Hall element (SW_B) 18 and the Hall element (SW_C) 19 are not simultaneously turned on. Consequently, the microcomputer 20 does not determine that the lock member 6 has reached the unlock position, and keeps driving the electric motor 14.

Similarly, when a strong external north-pole electromagnetic field is exerted, the Hall element (SW_B) 18 configured to be turned on upon detection of the south pole maintains its OFF state (Not Unlock (OFF)), and the Hall element (SW_C) 19 configured to be turned on upon detection of the north pole malfunctions to be turned on (Unlock (ON)). In this way, even when a strong north-pole electromagnetic field is exerted, the Hall element (SW_B) 18 and the Hall element (SW_C) 19 are not simultaneously turned on (Unlock (ON)). Consequently, the microcomputer 20 does not determine that the lock member 6 has reached the unlock position, and keeps driving the electric motor 14.

Hence, even if a strong electromagnetic field is exerted while the lock bolt 6 is moving from the lock position to the unlock position, the position of the lock bolt 8 is not falsely detected, which prevents driving of the electric motor 14 from being erroneously stopped even through the lock bolt 8 has not reached the unlock position yet.

When the lock bolt 8 (the magnet 11) moves to the unlock position, the two Hall elements (SW_B) 18 and (SW_C) 19 are both turned on (Unlock (ON)). The microcomputer 20 thereby finds that the lock bolt 8 has moved to the unlock position, and then stops driving the electric motor 14 and sends an unlock completion signal to the ECU. Upon receipt of the unlock completion signal from the microcomputer 20, the ECU starts the engine to allow the vehicle to be driven.

When the Hall element (SW_B) 18 and the Hall element (SW_C) 19 are not turned on due to a failure or the like even though the lock member 6 has moved to the unlock position, the microcomputer 20 stops the electric motor 14 after a lapse of a predetermined time period since the actuation of the electric motor 14 (i.e., enough time for the lock member 6 to move completely to the unlock position (e.g., one second)), and sends an abnormal signal to the ECU. Upon receipt of the abnormal signal from the microcomputer 20, the ECU suspends starting of the engine and lights a warning lamp placed on a meter panel or the like of the vehicle to notify the driver of the abnormality.

Moreover, when the Hall element (SW_A) 17 is not turned on due to a failure or the like even though the lock member 6 has moved from the unlock position to the lock position, the microcomputer 20 stops the electric motor 14 after a lapse of a predetermined time period since the actuation of the electric motor 14 (i.e., enough time for the lock member 6 to move completely to the lock position (e.g., one second)), and sends an abnormal signal to the ECU. Upon receipt of the abnormal signal from the microcomputer 20, the ECU, after stooping the engine, lights the warning lamp placed on a meter panel or the like of the vehicle to notify the driver of the abnormality.

As described, the electric steering lock device 1 of the present invention is configured to determine that the lock member 6 has moved to the unlock position when both of the Hall element (SW_B) 18 and the Hall element (SW_C) 19 placed at the unlock position are turned on. Hence, even when a strong external monopole (south-pole or north pole) electromagnetic field is exerted while the lock member 6 is moving from the lock position to the unlock position, the Hall element (SW_B) 18 and the Hall element (SW_C) 19 are not simultaneously turned on, and at least one of them maintains its OFF state. For this reason, the microcomputer 20 does not falsely determine that the lock member 6 has moved to the unlock position and keeps driving the electric motor 14, and the lock member 6 thus keeps moving to the unlock position.

Thus, the lock member 6 is prevented from being stopped halfway due to a false detection that the lock member 6 has moved to the unlock position even though the lock member 6 has actually not reached the unlock position yet. Thereby, if is reliably prevented that the engine is started with the rotation of the steering wheel being locked.

Further, in the electric steering lock device 1 of the present invention, the microcomputer 20 stops driving the electric motor 14 after a lapse of a predetermined time period when not detecting, due to a failure or the like, that the Hall element (SW_A) 17 is turned on or the Hall element (SW_B) 18 and the Hall element (SW_C) 19 are turned on even though the lock member 6 has moved to the lock position or the unlock position. Thus, it is prevented that the electric motor 14 is kept being driven.

<Embodiment 2>

Figure 6:
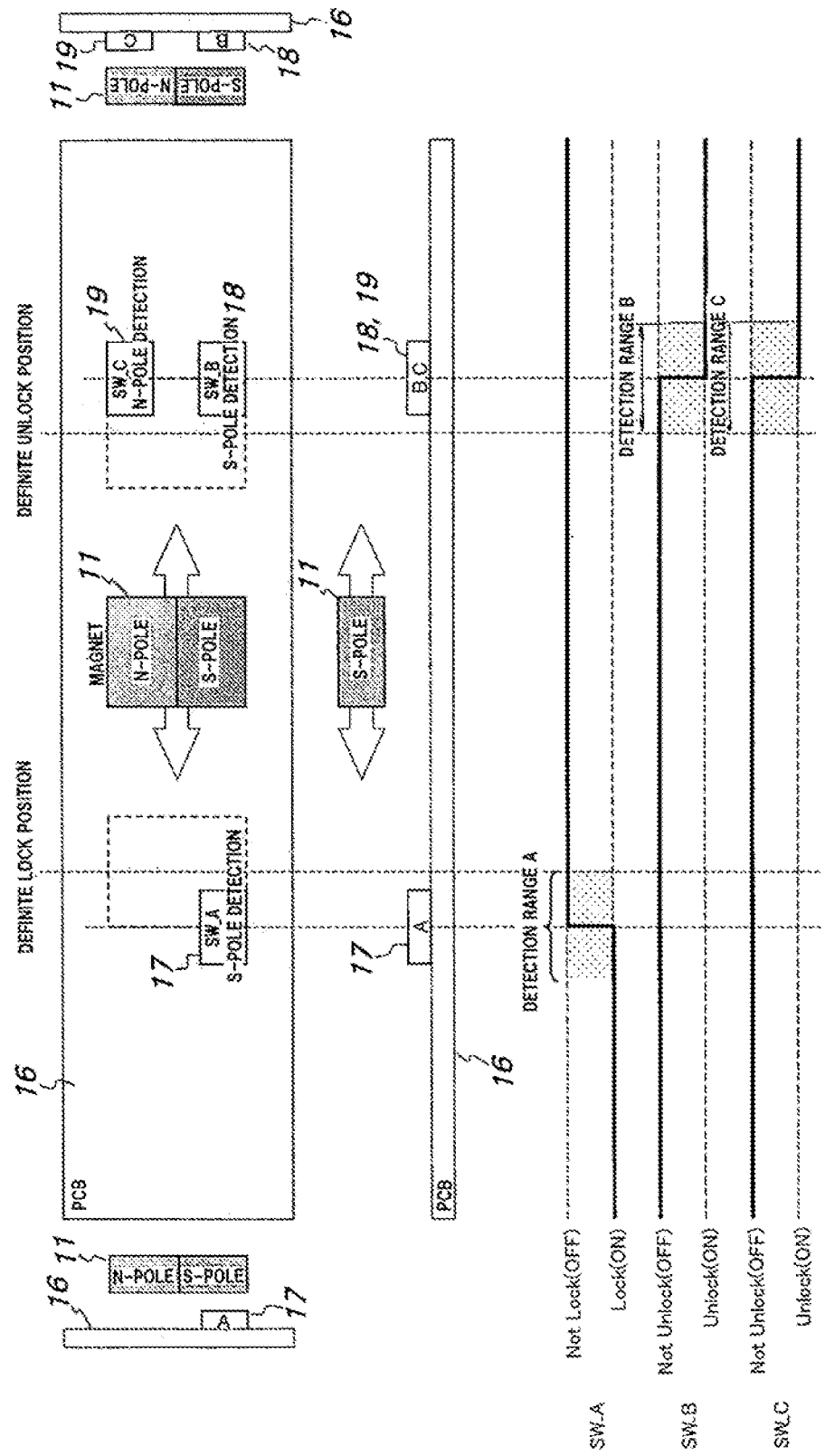
FIG. 6 is a diagram illustrating detection of the position of a lock member by Hall elements of an electric steering lock device according to Embodiment 2 of the present invention.

Next, Embodiment 2 of the present invention is described based on FIG. 6.

FIG. 6 is a diagram illustrating detection of the position of a lock member by Hall elements of an electric steering lock device according to Embodiment 2 of the present invention. The basic configuration of the electric steering lock device according to this embodiment, as well as that according to each of Embodiments 3 to 5 shown later, is the same as that of the electric steering lock device 1 according to Embodiment 1,and is therefore not repeatedly described. The reference numerals used in Embodiment 1 are used in the descriptions below.

In this embodiment, the north pole and the south pole of the magnet 11 are placed side by side in a direction (a vertical direction in FIG. 6) orthogonal to the moving direction of the magnet 11 (a horizontal direction in FIG. 6), and the Hall element (SW_B) 18 being a south-pole magnetic detection element and the Hall element (SW_C) 19 being a north-pole magnetic detection element are placed in the direction orthogonal to the moving direction of the magnet 11 to correspond to the arrangement of the south pole and the north pole of the magnet 11. Other configurations are the same as those of Embodiment 1.

This embodiment offers the same effects as those offered by Embodiment 1, and additionally offers the following effect. Specifically, since the south pole and the north pole of the magnet 11 are longer in the moving direction of the magnet 11 in this embodiment, the moving range of the magnet 11 in which the Hall element (SW_B) 18 and the Hall element (SW_C) 19 are simultaneously turned on can be made longer than that in Embodiment 1. Consequently, a position at which the magnet 11 is stopped at the unlock position can be set within a wider range to enhance design flexibility. When a position at which the magnet 11 is stopped at the unlock position can be set within a wider range, for example, there is no longer need for a component such as a stopper configured to forcibly stop the lock member 6 at a position at which the lock member 6 is maintained at the unlock state (i.e., the nail element 18 and the Hall element 19 are both turned on). Consequently, the configuration can be simplified in some cases.

<Embodiment 3>

Figure 7:
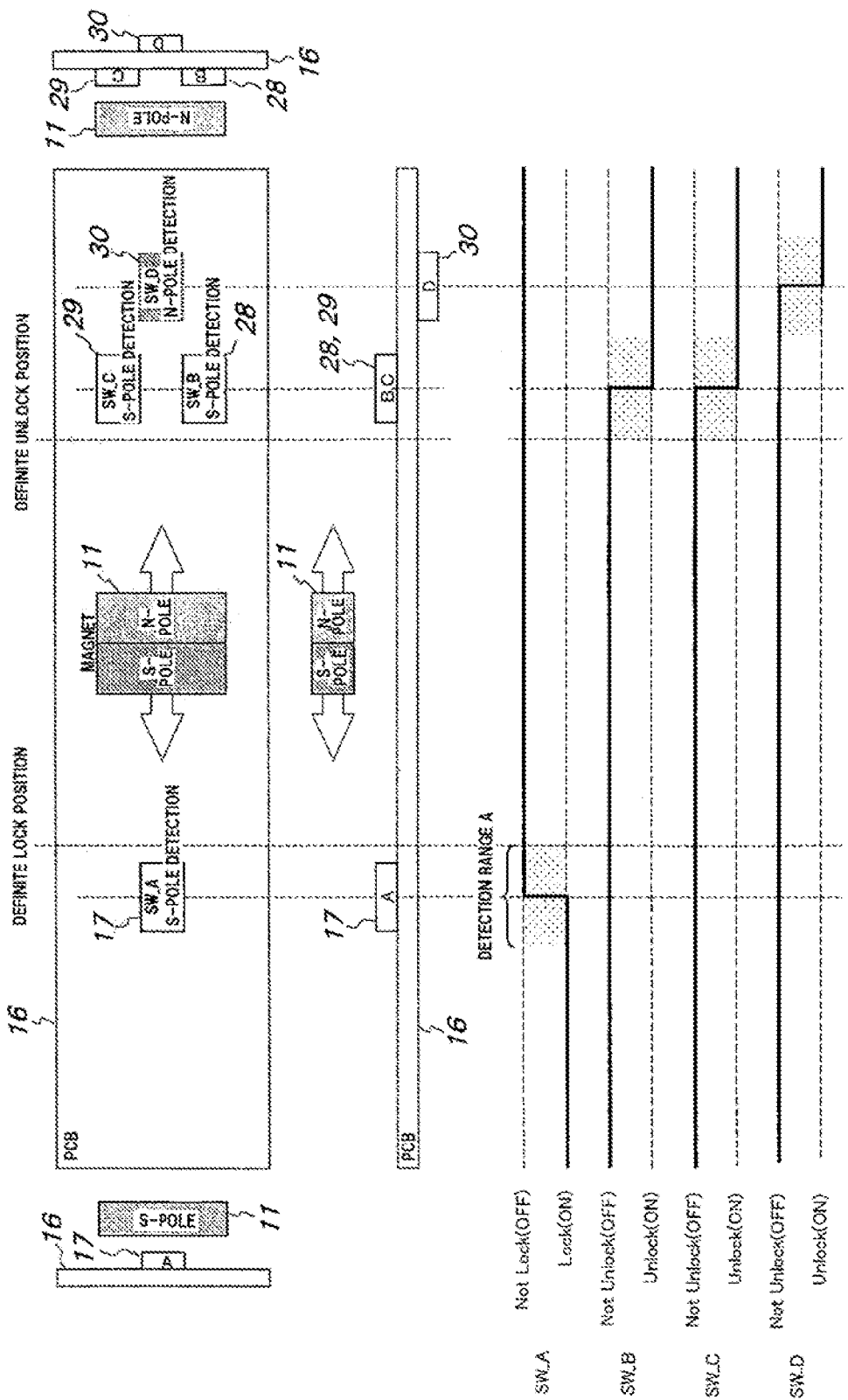
FIG. 7 is a diagram illustrating detection of the position of a lock member by Hall elements of an electric steering lock device according to Embodiment 3 of the present invention.

Next, Embodiment 3 of the present invention is described based on FIG. 7.

FIG. 7 is a diagram illustrating detection of the position of a lock member by Hall elements of an electric steering lock device according to Embodiment 3 of the present invention. The arrangement of the magnetic detection elements (Hall elements) at the unlock position in this embodiment is different from that in Embodiment 1.

Specifically, three Hall elements (SW_B) 28, (SW_C) 29, and (SW_D) 30, which are south-pole detection elements, are arranged at the unlock position, with the Hall element (SW_B) 28 and the Hall element (SW_C) 29 being placed on a surface of the printed circuit board 16 facing the magnet 11 (an upper surface in FIG. 7) and the Hall element (SW_D) 30 being placed on a surface of the printed circuit board 16 opposite from the surface facing the magnet 11 (a lower surface in FIG. 7). The Hall, element (SW_D) 30 functions as a north-pole detection element because its north-pole detection surface faces the magnet 11.

In this embodiment as well, when the magnet 11 moves to the unlock position along with the lock member 6, the Hall element (SW_B) 28 and the Hall element (SW_C) 29 detect the south pole of the magnet 11 and are turned on, and the Hall element (SW_D) 30 detects the north pole of the magnet 11 and is turned on. Thus, this embodiment offers the effects offered by Embodiment 1 and additionally the following effect.

Specifically, in this embodiment, since the Hall element (SW_D) 30 is placed on the surface of the printed circuit board 16 opposite to the surface facing the magnet 11, the orientation of the Hall element (SW_D) 30 with respect to the magnet 11 can be reversed. In other words, the orientation of a magnetic field passing through the Hall element (SW_D) 30 can be reversed so that the north pole of the magnet 11 can be detected by the Hall element (SW_D) 30 which is a south-pole magnetic detection element. The Hall element (SW_D) 30 can therefore function as a north-pole magnetic detection element. For this reason, the Hall elements (SW_B) 28, (SW_C) 29, and (SW_D) 30 can be configured with only south-pole magnetic defection elements, which can reduce parts control steps and the per-piece cost and consequently reduce the cost for manufacturing the electric steering lock device 1.

Although the Hall elements (SW_B) 28, (SW_C) 29, and (SW_D) 30 are configured with only south-pole detection elements in this embodiment, they may be configured with only north-pole magnetic detection elements. In this case, the Hall element (SW_D) 30 functions as a south-pole magnetic detection element.

<Embodiment 4>

Figure 8:
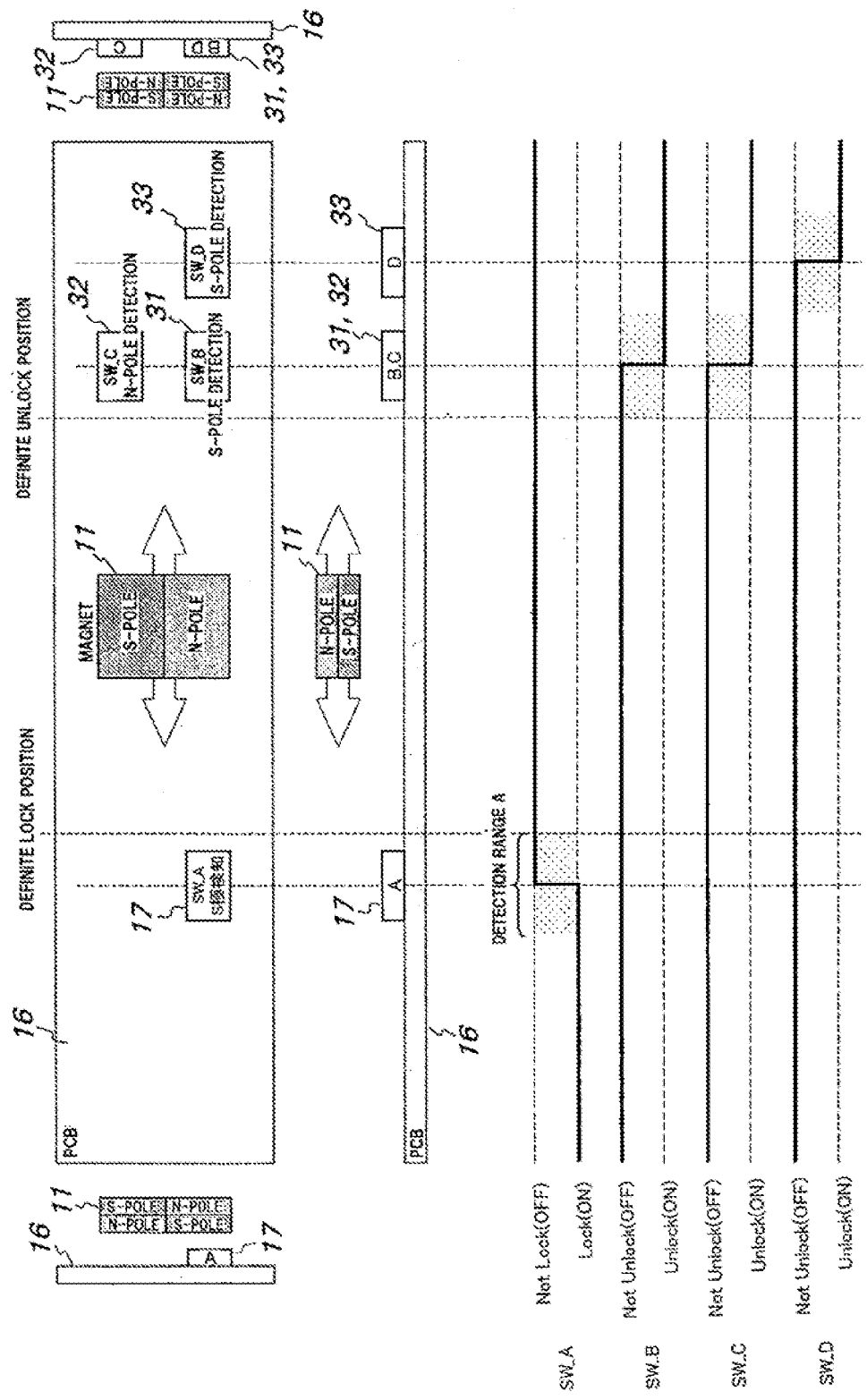
FIG. 8 is a diagram illustrating detection of the position of a lock member by Hall elements of an electric steering lock device according to Embodiment 4 of the present invention.

Next, Embodiment 4 of the present invention is described based on FIG. 8.

FIG. 8 is a diagram illustrating detection of the position of a lock member by Hall elements of an electric steering lock device according to Embodiment 4 of the present invention. In this embodiment, among three Hall elements (SW_B) 31, (SW_C) 32, and (SW_D) 33 placed at the unlock position, the two Hall elements (SW_B) 31 and (SW_D) 33 placed on one side or the printed circuit board 16 in its width direction (a lower side in FIG. 8) are configured with south-pole magnetic detection elements, and the Hall element (SW_C) 32 placed on the other side of the printed board 16 in its width direction (an upper side in FIG. 8) is configured with a north-pole magnetic detection element. The single Hall element (SW_A) 17 placed at the lock position is configured with a south-pole magnetic detection element.

The south pole of the magnet 11 is placed at a position to face the Hall elements (SW_A) 17, (SW_B) 31, and (SW_D) 33 which are the south-pole magnetic detection elements, and the north pole of the magnet 11 is placed at a position to face the Hall element (SW_C) 32 which is a north-pole magnetic detection element. On these south pole and north pole, another north pole and another south pole, i.e., their opposite poles, are placed, respectively. In other words, the magnet 11 has four parts in which adjacent ones have different poles from each other.

In this embodiment as well, when the magnet 11 moves to the unlock position along with the lock member 6, the Hall element (SW_B) 31 and the Hall element (SW_D) 33 detect the south pole of the magnet 11 and are turned on (Unlock (ON)), and the Hall element (SW_C) 32 detects the north pole of the magnet 11 and is turned on (Unlock (ON)). Thus, this embodiment offers the effects offered by Embodiment 1 and additionally the following effect.

Specifically, since the north pole and the south pole of the magnet 11 are superimposed in this embodiment, magnetic field loops can be extended long toward the printed circuit board 16 to increase the strength of the magnetic field to be detected by the Hall elements (SW_A) 17, (SW_B) 31, (SW_C) 32, and (SW_D) 33. This allows reliable detection of the position of the lock member 6.

<Embodiment 5>

Figure 9:
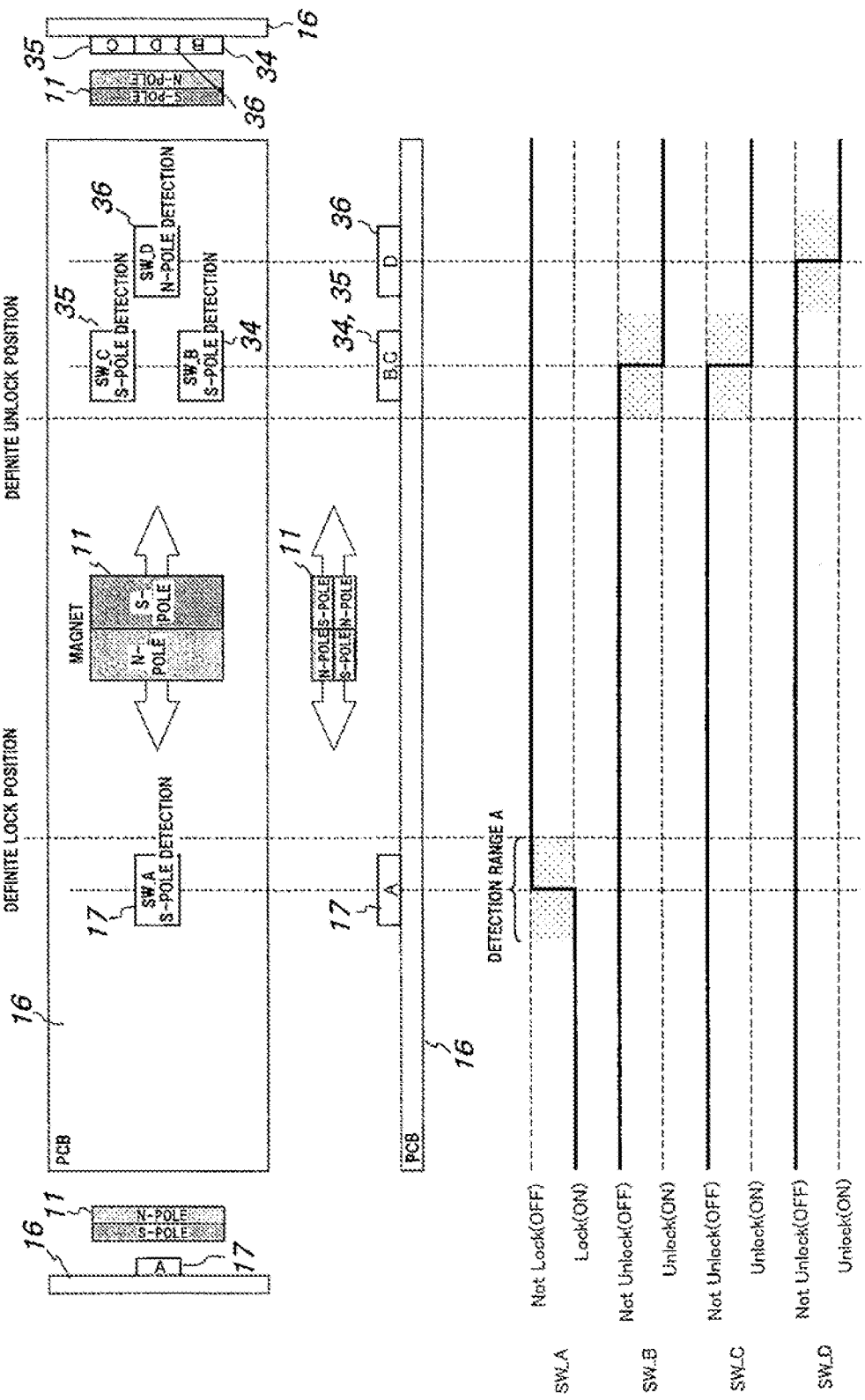
FIG. 9 is a diagram illustrating detection of the position of a lock member by Hall elements of an electric steering lock device according to Embodiment 5 of the present invention.

Next, Embodiment 5 of the present invention is described based on FIG. 9.

FIG. 8 is a diagram illustrating detection of the position of a lock member by Hall elements of an electric steering lock device according to Embodiment 5 of the present invention. In this embodiment, among three Hall elements (SW_B) 34, (SW_C) 33, and (SW_D) 36 arranged at the unlock position, the two Hall elements (SW_B) 34 and (SW_C) 35 placed side by side in the width direction of the printed circuit board 16 are configured with south-pole magnetic detection elements, and the Hall element (SW_D) 36 placed below (a right side in FIG. 9) those Hall elements is configured with a north-pole magnetic detection element. The single Hall element (SW_A) 17 placed at the lock position is configured with a south-pole magnetic detection element.

The south pole of the magnet 11 is placed at a position facing the Hall elements (SW_A) 17 when the magnet 11 moves to the lock position arm facing the Hall elements (SW_B) 34 and (SW_C) 35 when the magnet 11 moves to the unlock position, the Hall elements (SW_A) 17, (SW_B) 34, and (SW_C) 35 being south-pole magnetic detection elements. The north pole of the magnet 11 is placed at a position facing the Hall elements (SW_D) 36, which is a north-pole magnetic detection element, when the magnet 11 moves to the unlock position. On these south pole and north pole, another north pole and another south pole, i.e., their opposite poles, are placed, respectively. In other words, the magnet 11 has four parts in which adjacent ones have different poles from each other.

Thus, since the north pole and the south pole of the magnet 11 are superimposed in this embodiment like Embodiment 4, magnetic field loops can be extended long toward the printed circuit board 16 to increase the strength of the magnetic field to be detected by the Hall elements (SW_A) 17, (SW_B) 34, (SW_C) 35, and (SW_D) 36. This allows reliable detection of the position of the lock member 6. This embodiment also offers the same effects offered by Embodiment 1.

What is claimed is:

1. An electric steering lock device comprising:
   a lock member movable between a lock position at which the lock member engages with a steering shaft of a vehicle and an unlock position at which the lock member disengages from the steering shaft;
   an electric actuator configured to actuate the lock member;
   a driving mechanism configured to convert a drive force of the electric actuator into a force for making the lock member advance or retract;
   a magnet configured to move in conjunction with the lock member;
   magnetic detection means for detecting a magnetic force of the magnet, the magnetic detection means being placed at a position corresponding to the lock position and at a position corresponding to the unlock position; and
   control means for finding a position of the lock member based on a result of the detection by the magnetic detection means and accordingly controlling driving of the electric actuator, wherein
   the magnetic detection means placed at the position corresponding to the unlock position includes a north-pole magnetic detection element configured to be turned on upon detection of a north pole of the magnet and a south-pole magnetic detection element configured to be turned on upon detection of a south pole of the magnet, and
   the control means determines that the lock member has moved to the unlock position when both of the north-pole magnetic detection element and the south-pole magnetic detection element are turned on, and then stops driving the electric actuator.

2. The electric steering lock device according to claim 1, wherein
   the north pole and the south pole of the magnet are arranged side by side in a direction orthogonal to a moving direction of the magnet, and
   the north-pole magnetic detection element and the south-pole magnetic detection element are placed in the direction orthogonal to the moving direction of the magnet so as to correspond to the arrangement of the north pole and the south pole of the magnet.

3. The electric steering lock device according to any one of claims 1 to 2, wherein
   opposite poles from the north pole and the south pole, which are another south pole and another north pole, are superimposed on the north pole and the south pole of the magnet, respectively, on a side opposite from a side where the north pole and the south pole face the north-pole magnetic detection element and the south-pole magnetic detection element, respectively.

4. The electric steering lock device according to claim 3, wherein
   the magnetic detection means are placed on a printed circuit board,
   any one of the north-pole magnetic detection element and the south-pole magnetic detection element is placed on one surface of the printed circuit board which is opposite to a surface facing the magnet, and
   the magnetic detection element placed on the one surface is configured to function as a magnetic detection element configured to detect a magnetic force of the magnet, the magnetic force being of an opposite pole from that detected by the magnetic detection means placed on the surface facing the magnet.

5. The electric steering lock device according to claim 4, wherein
   the control means stops driving the electric actuator after a lapse of a predetermined time period since actuation of the electric actuator.

* * * * *